United States Patent [19]

Nelson, Jr.

[11] Patent Number: 5,675,653
[45] Date of Patent: Oct. 7, 1997

[54] METHOD AND APPARATUS FOR DIGITAL ENCRYPTION

[76] Inventor: Douglas Valmore Nelson, Jr., 916 Spring Creek La., Atlanta, Ga. 30350

[21] Appl. No.: 553,955

[22] Filed: Nov. 6, 1995

[51] Int. Cl.$^6$ .................................................. H04K 1/00
[52] U.S. Cl. .................................................. 380/28; 380/50
[58] Field of Search .................................. 380/29, 28, 49, 380/50, 21

[56] References Cited

U.S. PATENT DOCUMENTS

| | | | |
|---|---|---|---|
| 4,405,829 | 9/1983 | Rivest et al. | 178/22.1 |
| 5,214,703 | 5/1993 | Massey et al. | 380/37 |
| 5,351,300 | 9/1994 | Quisquater et al. | 380/50 |

OTHER PUBLICATIONS

PGP: Pretty Good Privacy, by Simon Garfinkel, O'Reilly & Associates, Inc. (1995) ISBN 1-56592-098-8.

*Primary Examiner*—David C. Cain
*Attorney, Agent, or Firm*—Sanford J. Asman

[57] ABSTRACT

The present invention is a real time digital encryption system which may be implemented in either hardware or software. The encryption system uses keys and an algorithm in which the encryption is determined in part by the data being encrypted, to obtain a scramble which is uniquely determined by the combination of the encryption keys and the data being encrypted, thereby making any effort at cryptanalysis extremely difficult, if not impossible. Consequently, anyone seeking to decrypt the data encrypted by the present invention would have to resort to an extensive brute force approach to such decryption efforts.

13 Claims, 5 Drawing Sheets

| i = | 2 | 1 | 0 | Round 1 |
|---|---|---|---|---|
| J[1](i) | 0 | 0 | 1 | r = 1 |
| K[1](i) | 2 | 1 | - | |

| b | 2 | | |
|---|---|---|---|
| i | 2 | 1 | 0 |
| b(i) | 0 | 1 | 0 |
| J(i) | 0 | 0 | 1 |
| N(i) = b(i) XOR J(i) | 0 | 1 | 1 |
| D(i) = cb(0 -> i-1) | 1 | 1 | - |
| K(i) | 2 | 1 | - |
| M(i) = D(i) >- K(i) | 0 | 1 | - |
| cb(i) = N(i) XOR M(i) | 0 | 0 | 1 |
| | 1 | | |

| b | 4 | | |
|---|---|---|---|
| i | 2 | 1 | 0 |
| b(i) | 1 | 0 | 0 |
| J(i) | 0 | 0 | 1 |
| N(i) = b(i) XOR J(i) | 1 | 0 | 1 |
| D(i) = cb(0 -> i-1) | 3 | 1 | - |
| K(i) | 2 | 1 | - |
| M(i) = D(i) >- K(i) | 1 | 1 | - |
| cb(i) = N(i) XOR M(i) | 0 | 1 | 1 |
| | 3 | | |

| b | 7 | | |
|---|---|---|---|
| i | 2 | 1 | 0 |
| b(i) | 1 | 1 | 1 |
| J(i) | 0 | 0 | 1 |
| N(i) = b(i) XOR J(i) | 1 | 1 | 0 |
| D(i) = cb(0 -> i-1) | 2 | 0 | - |
| K(i) | 2 | 1 | - |
| M(i) = D(i) >- K(i) | 1 | 0 | - |
| cb(i) = N(i) XOR M(i) | 0 | 1 | 0 |
| | 2 | | |

| b | 0 | | |
|---|---|---|---|
| i | 2 | 1 | 0 |
| b(i) | 0 | 0 | 0 |
| J(i) | 0 | 0 | 1 |
| N(i) = b(i) XOR J(i) | 0 | 0 | 1 |
| D(i) = cb(0 -> i-1) | 3 | 1 | - |
| K(i) | 2 | 1 | - |
| M(i) = D(i) >- K(i) | 1 | 1 | - |
| cb(i) = N(i) XOR M(i) | 1 | 1 | 1 |
| | 7 | | |

| b | 3 | | |
|---|---|---|---|
| i | 2 | 1 | 0 |
| b(i) | 0 | 1 | 1 |
| J(i) | 0 | 0 | 1 |
| N(i) = b(i) XOR J(i) | 0 | 1 | 0 |
| D(i) = cb(0 -> i-1) | 2 | 0 | - |
| K(i) | 2 | 1 | - |
| M(i) = D(i) >- K(i) | 1 | 0 | - |
| cb(i) = N(i) XOR M(i) | 1 | 1 | 0 |
| | 6 | | |

| b | 5 | | |
|---|---|---|---|
| i | 2 | 1 | 0 |
| b(i) | 1 | 0 | 1 |
| J(i) | 0 | 0 | 1 |
| N(i) = b(i) XOR J(i) | 1 | 0 | 0 |
| D(i) = cb(0 -> i-1) | 0 | 0 | - |
| K(i) | 2 | 1 | - |
| M(i) = D(i) >- K(i) | 0 | 0 | - |
| cb(i) = N(i) XOR M(i) | 1 | 0 | 0 |
| | 4 | | |

| b | 6 | | |
|---|---|---|---|
| i | 2 | 1 | 0 |
| b(i) | 1 | 1 | 0 |
| J(i) | 0 | 0 | 1 |
| N(i) = b(i) XOR J(i) | 1 | 1 | 1 |
| D(i) = cb(0 -> i-1) | 1 | 1 | - |
| K(i) | 2 | 1 | - |
| M(i) = D(i) >- K(i) | 0 | 1 | - |
| cb(i) = N(i) XOR M(i) | 1 | 0 | 1 |
| | 5 | | |

| b | 1 | | |
|---|---|---|---|
| i | 2 | 1 | 0 |
| b(i) | 0 | 0 | 1 |
| J(i) | 0 | 0 | 1 |
| N(i) = b(i) XOR J(i) | 0 | 0 | 0 |
| D(i) = cb(0 -> i-1) | 0 | 0 | - |
| K(i) | 2 | 1 | - |
| M(i) = D(i) >- K(i) | 0 | 0 | - |
| cb(i) = N(i) XOR M(i) | 0 | 0 | 0 |
| | 0 | | |

| b[1]= | cb[1]= | b[2](rotated L) |
|---|---|---|
| 2 | 1 | 2 (010) |
| 4 | 3 | 6 (110) |
| 7 | 2 | 4 (100) |
| 0 | 7 | 7 (111) |
| 3 | 6 | 5 (101) |
| 5 | 4 | 1 (001) |
| 6 | 5 | 3 (011) |
| 1 | 0 | 0 (000) |

FIG. 5

Round 2
r = 2

| i = | 2 | 1 | 0 |
|---|---|---|---|
| J[2](i) | 0 | 1 | 1 |
| K[2](i) | 1 | 0 | - |

| b | 2 | | | 6 | | | 4 | | |
|---|---|---|---|---|---|---|---|---|---|
| i | 2 | 1 | 0 | 2 | 1 | 0 | 2 | 1 | 0 |
| b(i) | 0 | 1 | 0 | 1 | 1 | 0 | 1 | 0 | 0 |
| J(i) | 0 | 1 | 1 | 0 | 1 | 1 | 0 | 1 | 1 |
| N(i) = b(i) XOR J(i) | 0 | 0 | 1 | 1 | 0 | 1 | 1 | 1 | 1 |
| D(i) = cb(0 -> i-1) | 3 | 1 | - | 3 | 1 | - | 1 | 1 | - |
| K(i) | 1 | 0 | - | 1 | 0 | - | 1 | 0 | - |
| M(i) = D(i) >= K(i) | 1 | 1 | - | 1 | 1 | - | 1 | 1 | - |
| cb(i) = N(i) XOR M(i) | 1 | 1 | 1 | 0 | 1 | 1 | 0 | 0 | 1 |
| | 7 | | | 3 | | | 1 | | |

| b | 7 | | | 5 | | | 1 | | |
|---|---|---|---|---|---|---|---|---|---|
| i | 2 | 1 | 0 | 2 | 1 | 0 | 2 | 1 | 0 |
| b(i) | 1 | 1 | 1 | 1 | 0 | 1 | 0 | 0 | 1 |
| J(i) | 0 | 1 | 1 | 0 | 1 | 1 | 0 | 1 | 1 |
| N(i) = b(i) XOR J(i) | 1 | 0 | 0 | 1 | 1 | 0 | 0 | 1 | 0 |
| D(i) = cb(0 -> i-1) | 2 | 0 | - | 0 | 0 | - | 0 | 0 | - |
| K(i) | 1 | 0 | - | 1 | 0 | - | 1 | 0 | - |
| M(i) = D(i) >= K(i) | 1 | 1 | - | 0 | 1 | - | 0 | 1 | - |
| cb(i) = N(i) XOR M(i) | 0 | 1 | 0 | 1 | 0 | 0 | 0 | 0 | 0 |
| | 2 | | | 4 | | | 0 | | |

| b | 3 | | | 0 | | | b[2]= | cb[2]= | b[2](rotated L) |
|---|---|---|---|---|---|---|---|---|---|
| i | 2 | 1 | 0 | 2 | 1 | 0 | 2 | 7 | 7 (111) |
| b(i) | 0 | 1 | 1 | 0 | 0 | 0 | 6 | 3 | 6 (110) |
| J(i) | 0 | 1 | 1 | 0 | 1 | 1 | 4 | 1 | 2 (010) |
| N(i) = b(i) XOR J(i) | 0 | 0 | 0 | 0 | 1 | 1 | 7 | 2 | 4 (100) |
| D(i) = cb(0 -> i-1) | 2 | 0 | - | 1 | 1 | - | 5 | 4 | 1 (001) |
| K(i) | 1 | 0 | - | 1 | 0 | - | 1 | 0 | 0 (000) |
| M(i) = D(i) >= K(i) | 1 | 1 | - | 1 | 1 | - | 3 | 6 | 5 (101) |
| cb(i) = N(i) XOR M(i) | 1 | 1 | 0 | 1 | 0 | 1 | 0 | 5 | 3 (011) |
| | 6 | | | 5 | | | | | |

METHOD AND APPARATUS FOR DIGITAL ENCRYPTION

BACKGROUND OF THE INVENTION

The present invention relates to a method and apparatus for performing digital encryption. In particular, the present invention relates to an encryption scheme which is particularly well adapted for use in a digital system, including a real time digital system, and which is particularly difficult to break.

As is known in the cryptography art, encryption (i.e., coding) techniques are used to permit data which is subject to undesired viewing or use to be encrypted (i.e., coded) such that it is difficult for one who is not authorized to view, or otherwise use the data, to do so.

As used herein, the term "plaintext" is used to refer to unencoded data, and the term "ciphertext" is used to refer to encrypted data. Notwithstanding the foregoing general definition, there will be times when the term "plaintext" is also used to refer to data which has already experienced an encryption step (sometimes called a "round" of encryption) and which is being passed into a subsequent encryption step. Also, those skilled in the art will recognize that, notwithstanding the name, "plaintext" is intended to include, not only textual data, but also binary data, whether in the form of a file, i.e., a computer file, or in the form of serial data being transmitted, i.e., from a communications system, such as a satellite system, a telephone system, or an electronic mail ("e-mail") system.

Those skilled in the cryptography art will recognize that typical digital encryption techniques generally utilize two well known techniques—substitution and transposition, both of which are easily accomplished in digital systems.

In particular, substitution involves the substitution of one value for another. In a digital system, in which the bit values are limited to "0" and "1", substitution is generally accomplished by performing an exclusive OR (XOR) operation. Referring to TABLE 1, the results of XOR operations between one bit of data A and one bit of data B are shown. As illustrated, the result of an XOR operation will be "0" if the two pieces of data being XOR'd are the same, i.e., both "0" or both "1", and it will be "1" if the two pieces of data are different, i.e., one is "0" and the other is "1". If A was one bit of a multibit plaintext and B was one bit of a multibit "encryption key", then the result will be one bit of the ciphertext.

TABLE 1

(XOR)

| A | B | Result of A(XOR) B |
|---|---|---|
| 0 | 0 | 0 |
| 0 | 1 | 1 |
| 1 | 0 | 1 |
| 1 | 1 | 0 |

A problem with using only the XOR operation in an encryption scheme is that if any two items (selected from the three items consisting of the "plaintext", the "ciphertext", and the "encryption key") are known, then the remaining item can be found, by simply performing an XOR operation on the two known pieces of data. In many systems, it is often possible to identify at least some portion of the "plaintext" and to associate it with a like portion of the "ciphertext". Consequently, it is relatively easy (in such cases) to break the code, i.e., to discern the "encryption key". Once the encryption key is known, the entire ciphertext can be decoded to obtain the plaintext.

Transposition involves changing (i.e., moving) the position of bits between the plaintext and the ciphertext. Such changes can simply involve bitwise rotation (shifting), as illustrated in TABLE 2, in which the bits of a 3-bit binary number are each shifted to the right by one position, with the rightmost (low order) bit moved to the leftmost (high order) bit position.

TABLE 2

(Transposition)

| Input | | | Output | | |
|---|---|---|---|---|---|
| A | B | C | A' | B' | C' |
| 0 | 0 | 0 | 0 | 0 | 0 |
| 0 | 0 | 1 | 1 | 0 | 0 |
| 0 | 1 | 0 | 0 | 0 | 1 |
| 0 | 1 | 1 | 1 | 0 | 1 |
| 1 | 0 | 0 | 0 | 1 | 0 |
| 1 | 0 | 1 | 1 | 1 | 0 |
| 1 | 1 | 0 | 0 | 1 | 1 |
| 1 | 1 | 1 | 1 | 1 | 1 |

An alternative scheme, involving both transposition and substitution, is illustrated in TABLE 3.

TABLE 3

(Transposition & Substitution)

| Input | | | Output | | |
|---|---|---|---|---|---|
| A | B | C | A' | B' | C' |
| 0 | 0 | 0 | 1 | 1 | 0 |
| 0 | 0 | 1 | 0 | 1 | 0 |
| 0 | 1 | 0 | 1 | 1 | 1 |
| 0 | 1 | 1 | 0 | 1 | 1 |
| 1 | 0 | 0 | 1 | 0 | 0 |
| 1 | 0 | 1 | 0 | 0 | 0 |
| 1 | 1 | 0 | 1 | 0 | 1 |
| 1 | 1 | 1 | 0 | 0 | 1 |

Again, minimal investigation will provide a predictable pattern in this example. The first place to look in the illustrated 3-bit system is to the line in which the input is "000". As shown, the output is "110", which tells you to XOR all outputs with "110". Upon carrying out that operation, the result will be TABLE 4. As shown below, TABLE 4 is identical to the Transposition table, i.e., TABLE 2. From TABLE 2 the relation of A'B'C'=CAB can be readily found. Accordingly, it is apparent that substitution and transposition alone are inadequate for successful encryption of digital data.

TABLE 4

| Input | | | Output | | |
|---|---|---|---|---|---|
| A | B | C | A' | B' | C' |
| 0 | 0 | 0 | 0 | 0 | 0 |
| 0 | 0 | 1 | 1 | 0 | 0 |
| 0 | 1 | 0 | 0 | 0 | 1 |
| 0 | 1 | 1 | 1 | 0 | 1 |
| 1 | 0 | 0 | 0 | 1 | 0 |
| 1 | 0 | 1 | 1 | 1 | 0 |
| 1 | 1 | 0 | 0 | 1 | 1 |
| 1 | 1 | 1 | 1 | 1 | 1 |

Block Cipher

Differential analysis of cryptographic texts demonstrates that for a cryptographic system to be successful, it must involve a complex number cipher. In a number cipher, for each input, there is a unique output. Consequently, in a system of X possible input numbers, there are X! possible combinations of scrambles.

In effect a number cipher is simply a substitution matrix. What makes this substitution important is that there are so many numbers, that given a random substitution system it would be impossible to find and record all of the input and output numbers for a given key.

In any number cipher there will always be "weak" scrambles, where a "weak" scramble is one in which it is relatively "easy" to use a plaintext attack. By way of example, consider a one bit(0) system. This system has possible values from 0 to 1. Each key for a cryptographic system can yield each possible value once for all possible inputs. Consequently, as output for bit 0, there are two possible values, i.e., 0 and 1. This output should depend on bit 0. There are two possible keys as shown in TABLE 5 below:

TABLE 5

| Bit 0 - Input | Key 1 | Key 2 |
| --- | --- | --- |
| 0 | 0 | 1 |
| 1 | 1 | 0 |

This shows that for a one bit system there are only two ways to scramble. Now, consider a two bit system. Number theory tells us there are 4!, i.e., 24, combinations. However, if we look at this as from the perspective that the previous bits, i.e., bit 0 in this case, have already been scrambled, we see that for all numbers these bits (in this instance only bit 0) can encompass, there will be two occurrences of the number, one where the next bit, i.e., bit 1, is 1 and one where the next bit is 0.

Counting takes clock cycles in a digital system, making it an inefficient process, so let's consider combinations in digital order, as shown in TABLE 6.

TABLE 6

| Input | 1 | 2 | 3 | 4 |
| --- | --- | --- | --- | --- |
| 00 | 00 | 00 | 10 | 10 |
| 01 | 01 | 11 | 11 | 01 |
| 10 | 10 | 10 | 00 | 00 |
| 11 | 11 | 01 | 01 | 11 |

There are other digital scrambles, but they are difficult to describe on a realtime digital level. Notice two things, first the ones and zeros for bit 1 of the output are grouped together vertically. Second, the output of bit 1 can be described solely by bit 0. Take the output of bit 1 based on bit 0 only and XOR by the input of bit 1.

This approach can be taken forward to bit 2. From this point, in a table relating an input to outputs, only previous bit inputs will be shown. The result will be referred to as xbit n, where n is the bit being considered. In considering xbit 2, there are eight easily describable xbit possibilities, as shown in TABLE 7.

TABLE 7

| Input | 1 | 2 | 3 | 4 | 5 | 6 | 7 | 8 |
| --- | --- | --- | --- | --- | --- | --- | --- | --- |
| 00 | 0 | 0 | 0 | 0 | 1 | 1 | 1 | 1 |
| 01 | 0 | 0 | 0 | 1 | 1 | 1 | 1 | 0 |
| 10 | 0 | 0 | 1 | 1 | 1 | 1 | 0 | 0 |
| 11 | 0 | 1 | 1 | 1 | 1 | 0 | 0 | 0 |

For each bit, n, for which this method is extended, there are $2^{n+1}$ possible keys as described in this system. This method can be extended to as many bits as may be needed. Encryption should occur where the previous bits (0,1, . . . ,n−1) which were used to find xbit n are the encrypted bits, not the plaintext. This assists in the scramble. Decryption is performed in the reverse order. Ignore cbit (cipher bit) n, and using the same key, find xbit n based on cbits 0,1, . . . ,n−1. Then XOR xbit n and chit n, to find the resultant bit n, performing this operation from chit n−1 to cbit 0.

Unfortunately, the foregoing approach alone is not adequately sophisticated to provide a truly strong cipher. The problem starts with the fact that bit n repeats on $2^n$ cycles. Also, bit 0 does not rely on any other bits. In a strong block cipher system, every cipher bit should rely upon every other plaintext bit.

This be accomplished logically as follows. If the encryption, as described above, of a block of n bits involves a round of encryption, with each round having a key length equal to the sum of integers from 1 to n, i.e., $(n)*(n+1)/2$. In a 56 bit cipher, such as DES, the key length would be 56*57/2, or 1596 bits.

In order to make every cipher bit rely on every plaintext bit, we put the plaintext though m sequential rounds of encryption. However, bit 0 should not be left as bit 0, nor should bit 1 be left as bit 1, i.e., do not leave bit n as bit n, as doing so would cause bit 0 to rely solely upon bit 0, bit 1 to rely solely upon bits 0, 1, and bit n to rely solely upon bits 0,1, . . . ,n−1. To correct this, the output of each round is rotated (common bitwise operation) by one bit (either left or right) and the result is the input of the subsequent round. The bits can be rotated left or right, as either rotation will not matter for the effective randomness of the system. In either case, every bit will ultimately rely on every other bit.

The result of this system is a seemingly random number cipher where every bit relies on every other bit. In order to attack this system, an analyst must work backwards, trying every key combination for each stage. Under chosen plaintext attack, only the plaintext and the output of the final stage is known. In order to find the relationship between input and final output, every possible key combination must be tried. Each stage cannot be attacked sequentially, since a cryptographer could not know the output of each stage. In order to attack the stages sequentially the individual stage outputs must be known or the attack must revert to BRUTE FORCE. This is the goal of a cryptographic design.

Serial Cipher

There are many uses for a block cipher, but in the digital world of telecommunications, data is usually transmitted serially, or one bit at a time. If encryption is necessary, a serial cipher can be incorporated, or the serial data can be converted into blocks of data for a block cipher to decode.

The cryptographic system described above can be used as a serial cipher. One such implementation would be as follows. First, the system caches the last n bits of data. This caching is sequential. As another bit is processed, the result is pushed on top of the stack and the bottom bit is lost.

This cache of n bits is encrypted using a block cipher, as described above of n bits. The nth cipher bit, chit n, is then used as an XOR bit for the data bit to be encryptect/decrypted. So, we take this xbit and XOR with the bit to be sent or the received bit. This will yield either the plaintext bit or ciphertext bit.

Note that it is important that the sender and receiver have the same cached bits in order for the cipher to work. Therefore, these bits should be either the plaintext bits or the ciphertext bits that have been sent or received. This is a matter of telecommunication protocol. The system, though demands that they are the same bits, although it is unimportant which bits they are.

As is well known by those skilled in the art, heretofore a number of encryption schemes have been used. Those prior encryption schemes could be broken down into two broad categories, i.e., private key cryptography and public key cryptography. A problem with private key cryptography is that the keys must be distributed over secure channels, or otherwise passed, prior to any encrypted communications.

A problem with public key encryption of the type described in U.S. Pat. No. 4,405,829, entitled CRYPTOGRAPHIC COMMUNICATIONS SYSTEM AND METHOD which issued on Sep. 20, 1983 to R. L. Rivest, Adi Shamir, and Leonard M. Adelman (the "RSA patent"), is that it requires a number of calculations, which means that communications in which the encryption used only public key encryption techniques were inordinately slow. However, the advantage of public key cryptography is that each potential recipient of an encrypted message could publish the public portion of his key which would allow another to send him an encrypted message which could not be decrypted, even by others who had knowledge of the public portion of the individual's public key. The way that this is accomplished is described in great detail in the RSA patent, the contents of which are incorporated herein by reference.

A private key encryption technique which has been used throughout the world for more than a decade is the so-called Data Encryption Standard ("DES") of the American National Bureau of Standards ("NBS"). DES is used for block encryption with individually selectable keys (i.e., secret key block encryption). Every plaintext block has a length of 64 bits, as does every ciphertext block. A sequence of 64 bits, 56 of which can be freely selected serves as the private key. The transmission of ciphertext blocks, encrypted by DES, may occur over a public network.

While the DES is generally considered to be a very good encryption tool, it has been an open, debatable question as to whether or not DES encryption has remained secure. Consequently, newer encryption techniques have been developed. One such technique, developed in Switzerland, is sometimes called the IDEA ("International Data Encryption Algorithm"), and it is the subject of U.S. Pat. No. 5,214,703 entitled DEVICE FOR THE CONVERSION OF A DIGITAL BLOCK AND USE OF SAME, which issued on May 25, 1993 ("the IDEA patent"), the contents of which are incorporated herein by reference. An advantage of private key encryption as described in the IDEA patent is that it is considerably faster than public key cryptography.

Combinations of public key cryptography and private key cryptography have also been developed. Such combinations take advantage of the fact that public key cryptography permits easy passing of so-called "session keys" which include a unique private key which is needed for encrypting a message for a single session. An example of a composite public/private key technique can be found in the so-called PGP or "Pretty Good Privacy" software written by Phil Zimmermann, copies of which are widely distributed over the Internet. Descriptions of PGP are found in the manuals which accompany the distribution copies, and in the source code, which is also widely distributed over the Internet. PGP is also described in some detail (as are other cryptography techniques) in a book entitled *PGP: Pretty Good Privacy*, which was written by Simon Garfinkel and published by O'Reilly & Associates, 103 Morris Street, Suite A, Sebastopol, Calif. 95472 (Copyright 1995).

Notwithstanding the foregoing available encryption techniques, there remains a need for a real time digital encryption technique which could be used to encrypt data as such data which is generated and transmitted over a communications channel. As those skilled in the art will readily recognize, with current digital communications techniques and apparatus, many former analog devices, i.e., telephones and television transmissions, are now capable of digital transmission. It would be desirable to be able to encrypt such information "on the fly", rather than in advance.

SUMMARY OF THE INVENTION

The present invention is a real time digital encryption system in which input data ("plaintext") which is to be passed over a communications channel, i.e., through some medium in which it might be viewed or intercepted. For example, and without limiting the foregoing a communications channel could include a computer network, a cellular or land line telephone system, a satellite transmission, a computer disk, or any other type of media, which can be used to transfer data in digital form. The cryptographic communications system of the present invention comprises a communications channel. As used herein, the term "communications channel" simply means the media over which the digital data is being transported. The system further comprises an encoding means coupled to the communications channel. The encoding means is adapted for transforming a transmitted plaintext signal, b, into a ciphertext signal, c, and for transmitting the ciphertext, c, over the communications channel. The cryptographic system uses at least a pair of keys, J and K, where J and K are used, in connection with the plaintext signal, b, to create a scramble of the original plaintext signal in accordance with the formula:

$$cb(i)=b(i) XOR (\text{Boolean}(cb(0 \to i-1) \geq K(i))) XOR\ J(i),$$

where cb(i) is the output cipherbit, b(i) is the input plaintext bit, J(i) is a bit from the first encryption key, K(i) is a set of i bits from the second encryption key, and the expression:

$$\text{Boolean}(cb(0 \to i-1) \geq K(i))$$

is 1 if the value of the preceding cipherbits, expressed as a single number is greater than or equal to the value of bits 1 through i of the K key, expressed as a single number having i bits, and the expression Boolean(cb(0→i−1)≥K(i)) is 0 if the value of the preceding cipherbits, expressed as a single number is less than the value of the number which bits 1 through i of the K key represent, expressed as a single number having i bits.

The foregoing describes what takes place in a single "round" of encryption. However, there may be several encryption rounds. In such case, the system is further augmented by separating the individual rounds of encryption by a further step in which a third key, called the L key, is used. The L key has one of two possible values, i.e., either 0 or 1. When the L key has one of the values, the bits of the ciphertext are rotated to the left, and when said L key has the other value, the bits of the ciphertext are rotated to the right before they are passed into the next encryption round.

In addition to the foregoing device, the inventive method which carries out the invention is also described. In accordance with the inventive method, one selects a first key, K, which can be expressed by a number of bits, $(n-1)*n/2$, as there is a K(i) having i bits for each of the n bits in the plaintext. A second key, J, which can be expressed by a number of bits, n, is also selected. A plaintext message, b, i.e., the message to be encrypted into a ciphertext, cb, is obtained by reputedly performing the following steps. First the plaintext message, b, is broken into blocks, each block having no more than n bits. Next the bitwise operation $cb(i)=b(i)$ XOR (Boolean($cb(0 \rightarrow i-1) \geq K(i)$)) XOR $J(i)$ is performed on the blocks, whereby, the ciphertext message cb(i) will be created in a bitwise manner.

The encryption method described above performs one round of encryption. As additional rounds of encryption may be desired, the inventive method can comprise the further step of selectively rotating the n bits of the ciphertext either to the right or to the left as determined by a rotation key, L. The rotation key, L, has one of two possible values, which determine, respectively whether the cipherbits should be rotated left or right between rounds.

BRIEF DESCRIPTION OF THE DRAWING

In the Drawing:

FIG. 3 is a set of tables which illustrate a first round of encryption in a three bit, three round encryption system;

FIG. 4 is a set of tables which illustrate the second round of the three bit, three round encryption system of FIG. 3; and FIG. 5 is a set of tables which illustrate the third round of the three bit, three round encryption system of FIG. 3.

DETAILED DESCRIPTION OF THE PREFERRED EMBODIMENT OF THE INVENTION

As used herein the term "round" refers to the encryption of all of the input "plaintext" bits. The "plaintext" bits are relative, i.e., they are "plaintext" only for the current round, but not necessarily the input "plaintext" bits. Similarly, the term "ciphertext" is also used to refer to the relative output of the present round. Finally, a pair of keys, J and K, are also relative to a specific round.

Figure 1:
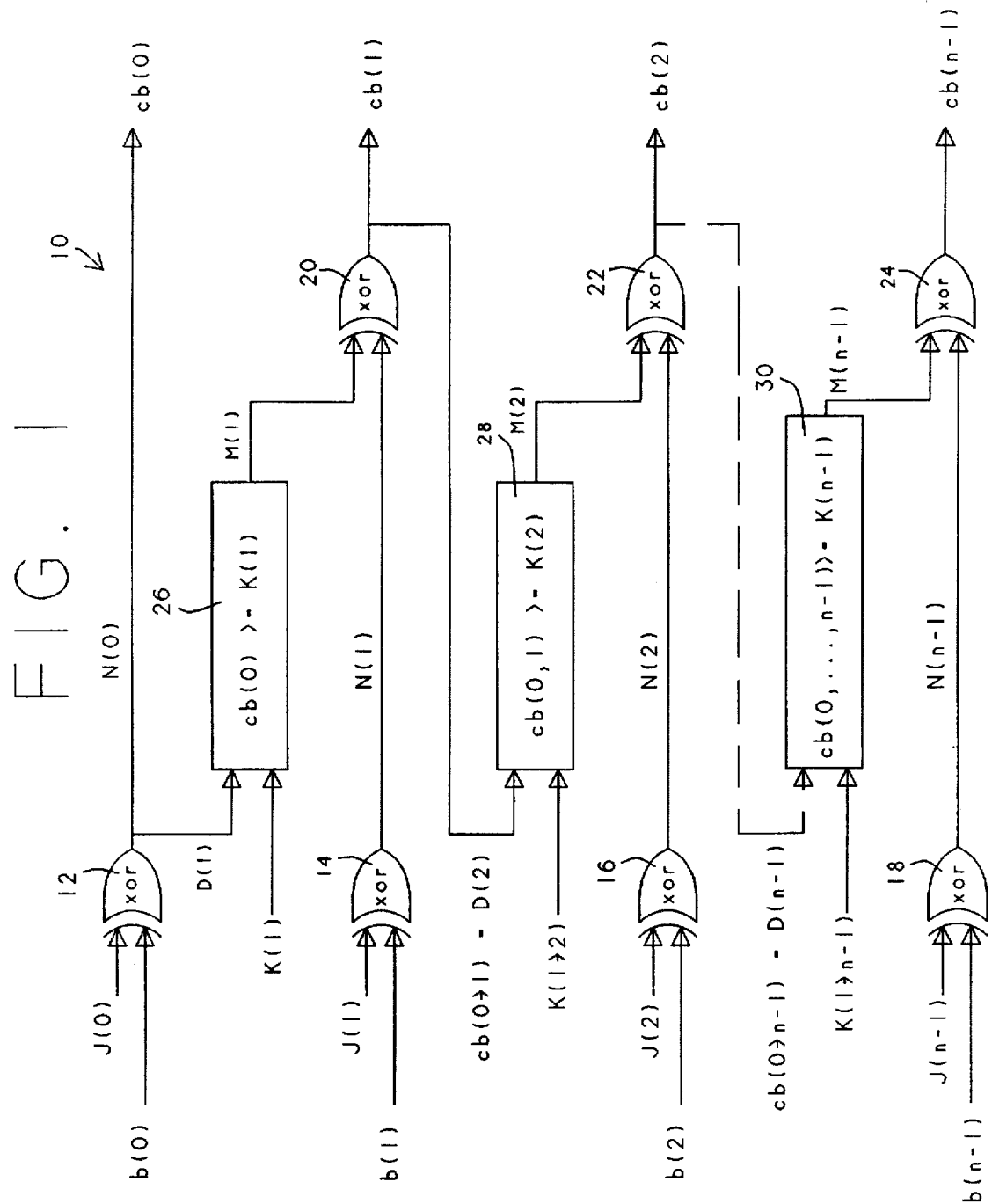
FIG. 1 is a block diagram illustrating a "round" of encryption in accordance with the present invention.

With reference to FIG. 1, a "round" of encryption, using an encryption system 10, is described. The encryption system 10 illustrates a block cipher having n bits. We would first input the first bit of the plaintext, referred to herein as bit 0, or b(0) into an exclusive OR ("XOR") gate 12. Also, input into the XOR 12 is bit 0 of a first key, J, referred to herein as J(0). Because XOR 12 is the device into which b(0) and J(0) are input, XOR 12 may be also be referred to as XORi(0). By this nomenclature, it is intended to use the designation XORi(n) to mean the n-th input XOR gate. As will be seen hereafter, an n-bit input will require n input XOR gates 12, 14, 16, 18, which may also be referred to herein as XORi(0), XORi(1), ..., XORi(n-1).

As further illustrated in FIG. 1, for each input bit, there is also an output XOR gate, referred to in the general case as XORo(i). Note that XORi(0) is the same as XORo(0), so XOR 12 is both an "input" XOR gate, i.e., one which accepts an input, and an "output" XOR gate, i.e., one which yields a cipherbit output. Thus, the output of XOR 12 or XORo(0) is cipherbit 0, called cb(0). In general, the output of XORo(i) is cb(i). The remaining output XOR gates 20, 22, 24 are illustrated in FIG. 1. Their outputs are cb(1), cb(2), and cb(n-1), respectively.

Similarly, the outputs of XORi(1), ..., XORi(n-1) will be referred to as N(1), ..., N(n-1). Note that cb(0) and N(0) are equal, whereas in the general case, the output of XORi(i) will yield N(i) which is an intermediate result in the ultimate determination of cb(i). Thus, in the general case, b(i) and J(i) are inputs into XORi(i), and the output of XORi(i) will be N(i). Also, as illustrated in FIG. 1, the interemediate output of any input gate XORi(i) will be N(i), and, except for N(0), N(i) is also an input into the current output gate XORo(i).

In addition to the XOR gates 12, 14, 16, 18, 20, 22, 24, the encryption system 10 of FIG. 1 further comprises a set of n-1 encryption boxes 26, 28, 30, or E(1), ..., E(n-1). Each encryption box will have a number of inputs which corresponds to twice the number of "preceding" output bits. In general, encryption box E(i) will have 2i inputs. One of the inputs into each of the encryption boxes is comprised of bits 1 through i of (n-1) i-bit "arithmetic" keys, K, each referred to herein as K(i). By way of example, for n=4, there will be a K(1) having 1 bit, a K(2) having 2 bits, and a K(3) having 3 bits. The remaining i-bits which go into each encryption box correspond to the outputs of the preceding output XOR gate, i.e., eb(0), ..., eb(n-2). Note that there is no encryption box used to determine the first cipherbit, cb(0), as there were no preceding output cipherbits. Thus, i of the inputs into encryption box E(i) will be cb(0), ..., cb(i-1).

The purpose of the encryption boxes 26, 28, 30 is to compare the number D(i) which is made up of the preceding cipherbit outputs to the current arithmetic key, and to obtain an output, M(i), which is 1 if D(i) is greater than or equal to K(i), and which is 1 if D(i) is less than K(i). As D(i) is the number which is made up of the preceding cipherbit outputs, cb(0), ..., cb(i-1), the notation cb(0, ..., i-1) is equivalent to D(i). Further as D(i) is being compared to the arithmetic value of K(i), the notation eb(0)≥K(i) refers to the function which is performed by encryption box E(i), whose output, M(i), will be either 0 or 1.

With continued reference to FIG. 1, the output, M(i), of each encryption box, E(i), is one of the inputs into each of the output XOR gates XORo(i). As will be understood by those skilled in the art, while the description of the operation of the encryption boxes contemplates that there is a comparison of D(i) with K(i), each of which is made up off-bits, it is only necessary to compare the highest order bits D(i) and K(i) until the determination of which is greater can be accomplished.

A special case, in which no encryption is desired, is also possible. In the special case J[r](0)=0 and J[r](1→n-1)=1, i.e., key J is zero for the first round, and is then always 1. Also, K[r](0→n-1)=0.

In order to decrypt a message which has been encrypted using the present invention, the same steps are performed in reverse. We know the keys, J, K and L, and we know all of the cb(i). Accordingly, we can work backwards, first performing any required rotation, and next performing the decryption equation:

$$b(i)=cb(i)XOR(\text{Boolean}(cb(0), \ldots, cb(i) \geq K(i))XOR\ J(i)$$

Note that the decryption equation is, above, is the "inverse" of the encryption equation:

$$cb(i)=b(i)XOR(\text{Boolean}(cb(0), \ldots, cb(i) \geq K(i))XOR\ J(i)$$

Figure 2:
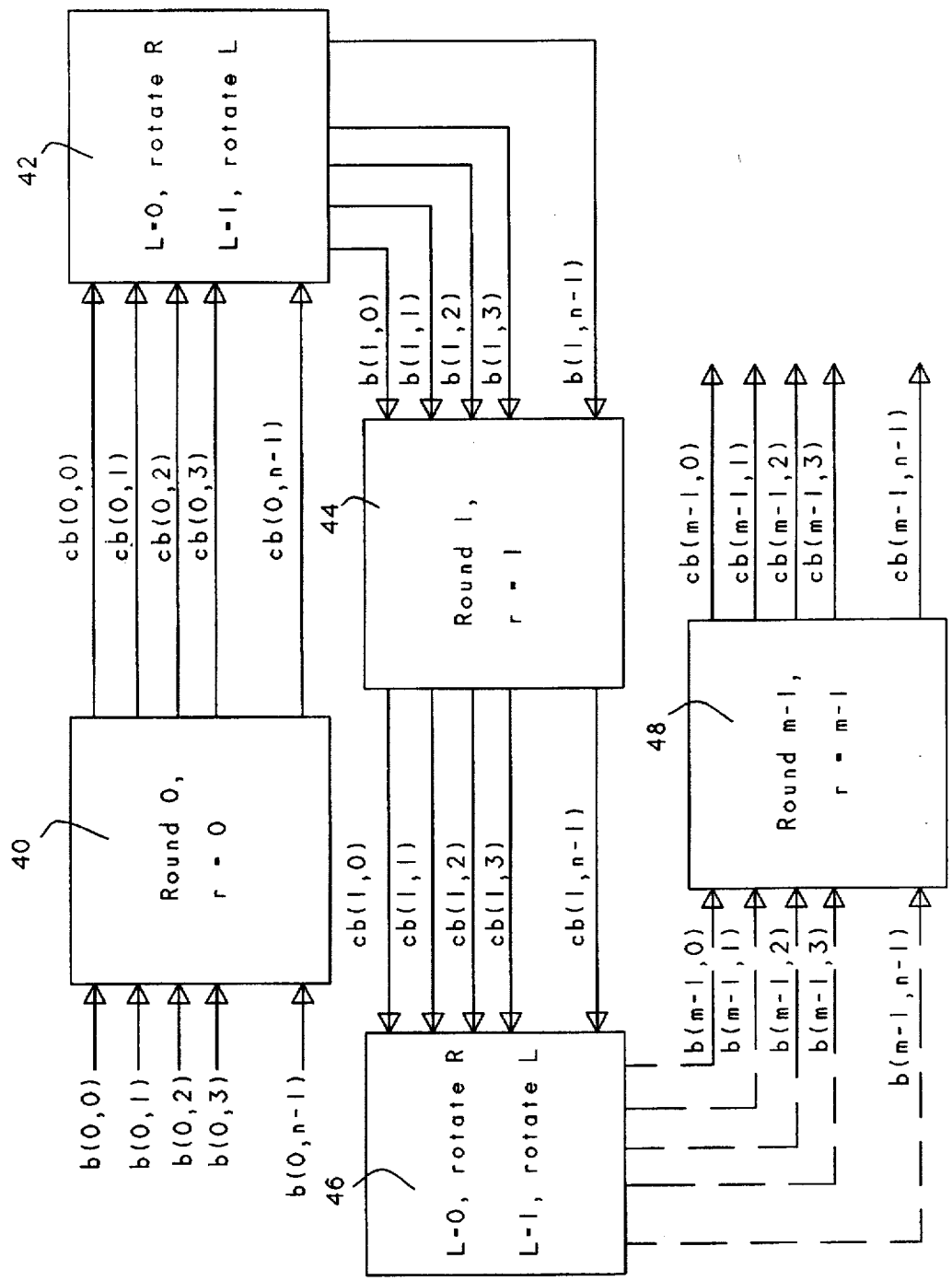
FIG. 2 is a block diagram illustrating a block encryption.

Referring now to FIG. 2, a further embellishment upon the present invention is illustrated. Described above was what takes place in each individual "round" of encryption. As shown in FIG. 2, a "block" encryption is actually comprised of a series of successive encryption "rounds". Further, after each "round", the output bits of the round could be shifted (left or right) to further enhance the encryption. In FIG. 2, block 40 illustrates the first encryption round, round 0 (i.e., r=0). The input plaintext into the encryption, is comprised of n plaintext bits, referred to as b(0, 0), . . . , b(0, n−1). The output of the encryption block 40 are cipherbits, cb(0, 0), . . . , cb(0, n−1). A shift block 42 selectively performs either a right shift or a left shift, depending upon a shift key, L, which may be either 0 (to indicate a rotation to the right), or 1 (to indicate a rotation to the left). The output of the shift block 42 are referred to as "plaintext" (not really original plaintext, but called "plaintext" because it will be input into a subsequent encryption block 44) bits b(1, 0), . . . , b(1, n−1). The output "plaintext" bits, b(1, 0), . . . , b(1, n−1), are input into the next encryption block 44, whose output bits, cb(1, 0), . . . , cb(1, n−1), are rotated in a rotation block 46. The procedure described is repeated through m rounds to yield the ultimate output bits, cb(m−1, 0), . . . , cb(m−1, n−1), as shown.

Figure 3:
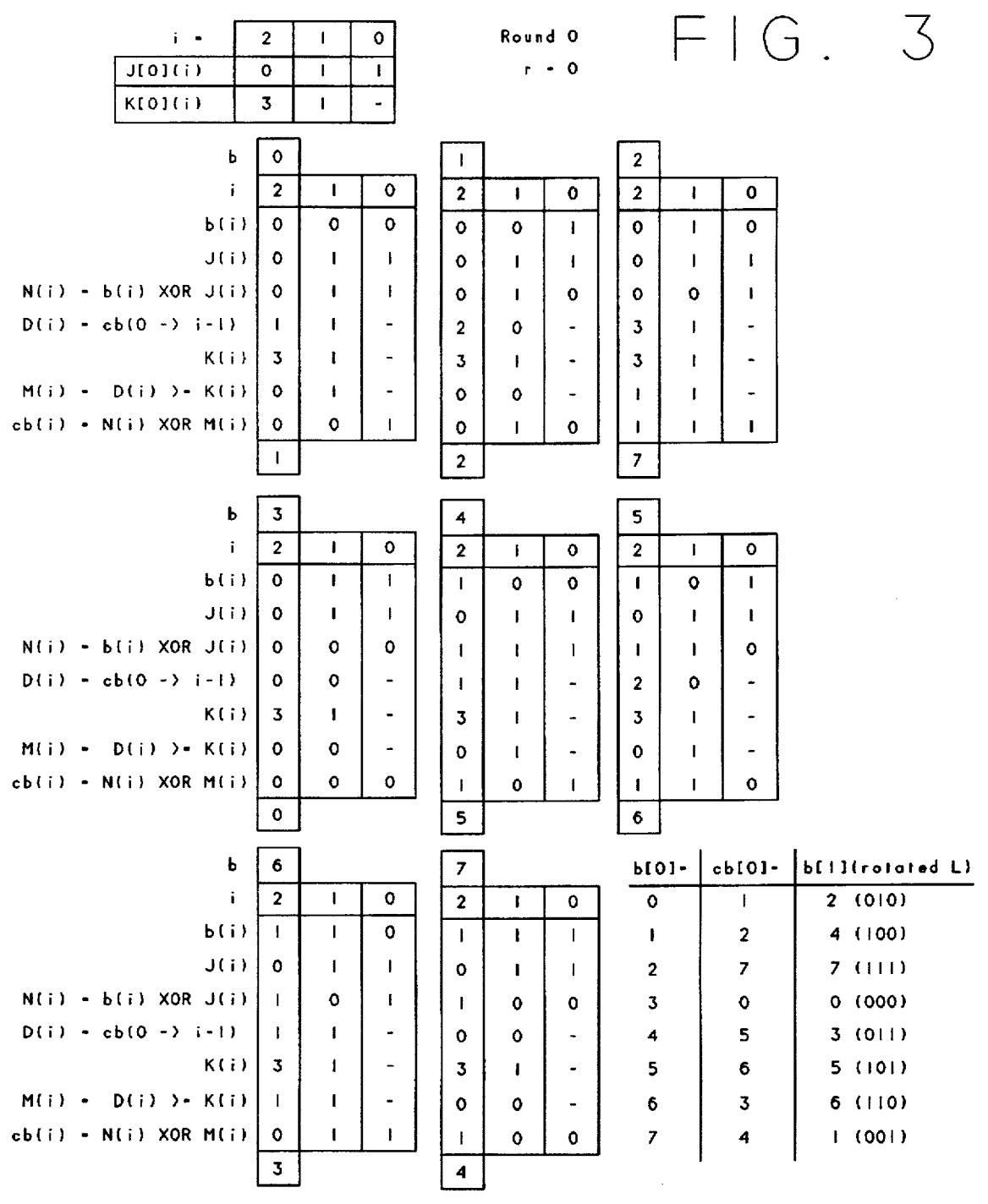

To further illustrate the operation of the present invention, by way of example, refer now to FIGS. 3–5 in which a 3-bit system having 3 encryption rounds is shown. First, with reference to FIG. 3, the first round, round 0, is shown. At the top of FIG. 3 the keys J and K for round 0, are shown. Thereafter, there are a series of tables in which three rounds of a 3-bit encryption are described. In each table the plaintext occupies a position at the top of the table, while the encryption of that particular plaintext is illustrated in the table. In order to simplify the explanation, the plaintext at the top of each table is expressed as a base 10 number. Thus, in the first row of tables in FIG. 3, the plaintext is, respectively, 0, 1, and 2. The second row of tables has plaintext 3, 4, and 5; and the third row has tables for plaintext 6 and 7.

The row immediately below the plaintext row (row "b") is row "T" which illustrates the three binary bit positions which make up each of the plaintext numbers, and the next row (row "b(i)") illustrates the binary equivalent of the plaintext. Thus, the binary equivalent of 6 is 110, as shown in the first table in the third row of tables in FIG. 3.

The next row down is the J(i) row, which represents the bits of the current round for key J. Using the notation J[round](i), this is actually J[0](i), i.e., the J key bit for round 0. Thereafter, row N(i) is representative of b(i) XOR J(i). The following row contains a decimal number which corresponds to the value of the bits of cb(0), . . . , cb(i−1). In FIG. 3, this row is referred to as D(i). As the first bit position of cb is position 0, the value of D(0) is not defined. Accordingly, the value of D(0) is shown as "−", although it will be treated as 0.

Following the D(i) row, is the K(i) row, which represents the decimal value of the current round's K key. The K key is called the "arithmetic key", because it contains arithmetic values which are compared to the values of the D(i) row in order to obtain the values which are in the next, M(i), row. The M(i) row contains binary values which are 1 if D(i) is greater than or equal to N(i). Finally, cb(i) is equal to N(i) XOR M(i). In performing this XOR, any M(i) which is shown as "−" is treated as 0.

In order to illustrate the foregoing, refer now to the i=0 column of the left hand table on the top row of FIG. 3 (This is the table for plaintext 0.). As b=0 (decimal), it is expressed as 000 in the b(i) row. J(0), for round 0 (i.e., J[0](0)) is 1, so N(0)=1, i.e., b(0) XOR J(0), or "0" XOR "1". D(O) is "−", as there was no prior cb. Consequently, D(0) is treated as 0. K(O) for round 0 is "−", as there would be nothing with which to XOR it, so M(0) is also "−". cb(0) is equal to 1, as it is N(i) XOR M(i), or 1 XOR 0, since M(i)="−" is treated as 0.

In the next column of the table, i=1, b(1) is 0 and J(1) is 1, so N(1), which is equal to b(1) XOR J(1) is 1. D(1) equals the decimal value of the prior cb bits. As cb(0) was 1, D(1) is 1 (decimal). K(1) is 1, so M(1) is also 1 (i.e., D(1) is equal to M(1)). cb(1) is equal to N(1) XOR M(1), so cb(D is 0.

Finally, in the column for i=2, b(1) is 0, J(2) is 0, so N(2) is 0. D(2) equals the decimal value of the prior cb bits (01), so D(2) is 1. K(2) is 3, so M(2) is 0, as 1 is less than 3. Thus, cb(2) is 0, as N(2) XOR M(2) is 0.

As cb(0) was 1, and cb(1) and cb(2) were 0, cb is "001" or 1, as shown in the single column in the row at the bottom of the table.

Reference to the remaining tables of FIG. 3 illustrates how the remaining 3 bit numbers (1 through 7) would be encrypted in the first encryption round (round 0). The table at the bottom right of FIG. 3 illustrates the encryption of the various values orb (plaintext) into the respective values of cb (ciphertext). Further, the third column of the table illustrates the rotation, which was referred to above, which involves the L key. In this round, L=1, which indicates that the bits which comprise cb should be rotated one position to the left. Thus, an input of b=0, becomes an initial output of cb=1. After rotation of the bits one position to the left (i.e., 001 becomes 010), the new value, referred to as b(1) is 2.

In the foregoing example three keys are used, J (the XOR key), K (the arithmetic key), and L (the rotation key). The steps described in performing the encryption are steps which are limited to XORs and comparisons (i.e., greater than or equal to). These steps are readily performed by digital hardware or software in real time. Accordingly, the present invention provides an encryption means which is readily operated in real time.

Referring now to FIGS. 4 and 5, two additional rounds of encryption are illustrated. As shown in FIGS. 4 and 5, each round can have its own unique keys, J, K, and L.

Following the three rounds of encryption and rotation the outputs are scrambled relative to the inputs such that an input of 0 became an output of 7, an input of 1 became an output of 6, an input of 2 became an output of 2, an input of 3 became an output of 4, an input of 4 became an output of 1, an input of 5 became an output of 0, an input of 6 became an output of 5, and an input of 7 became an output of 3. Accordingly, the outputs have been scrambled relative to the inputs.

As described above, the encryption scheme can readily be incorporated into a real time digital communications system useful in transferring any data which can be expressed in digital form, including computer data, text files, or data which is being communicated over a digital medium, or which has been digitized for transmission. Such data could include telephonic (including cellular) voice data, television (including satellite transmission) data, as well as all forms of data presently known, or hereafter created. As will be understood by those skilled in the art, the encryption system of the present invention could readily be manufactured using hardware, firmware, dedicated encryption chips, or implemented in software.

Referring now to Appendix A, a soft-ware implementation of the present invention is shown. The software implementation uses the C++ language to implement the encryption system. In the program of Appendix A, C++ classes are defined to include the Cbits class, which was created to allow for easily setting one bit in a set, getting the value of one bit in a set, and for performing the rotation of the bits in a set. CCoder is a class which codes and decodes data. Note that in the program, L, is always 0, i.e., there is always a right rotation following each round. Also, note that a procedure called MakeKeys() is defined within the CCoder class. The MakeKeys() procedure distributes the n-bits of a masterkey into the J and K keys, and it could be readily modified to create an L key.

When the program of Appendix A is run, the plaintext message "ITS ALL GREEK TO ME" is converted into ASCII codes representative of the letters to yield:

73 84 83 32 65 76 76 32 71 82 69 75 32 84 79 32 77 69

The coded message will be:

-36 -82-88 119 -84 -34-34 119 -48 -54 -44 -44 -40 119 -82 -32 119 -28 -44

After decoding, the original ASCII codes will be obtained, resulting once again in the message, "ITS ALL GREEK TO ME".

APPENDIX A

```cpp
#include <stdio.h>
#include <conio.h>
#include <iostream.h>
#include <string.h>
#define    n         8     // Defines the number of bits in the encryption
#define    true      1
#define    TRUE      1
#define    false     0
#define    FALSE     0
/******************************************************************
       CBits is a class that was created to allow easy
       setting of one bit in a set, getting
       the value of one bit in a set, and
       rotation of the bits in a set.
*******************************************************************/
class CBits{
    public:
       CBits( );                              //Constructor initializes the bitfield
       ~CBits( ) { };                         //Destructor does nothing
       void    Zero( );                       //Sets all bits to zero
       void    RotateR ( CBits it );          //Rotates the bitfield to the right
       void    RotateL ( CBits it );          //Rotates the bitfield to the left
       char    GetBitValue (int k);           //Returns the value of bit k
       void SetBitValue(int k,char val);      //Sets bit k to value val
       void SetChar(int k,char val);          //Sets char k of the bitfield to val
       char GetChar(int k);                   //Returns char k of the bitfield
                                              //note:could increase speed by using longer data types
                                              //because machines are no longer 8bit
       void SetChars(char* where);            //Sets the bitfield to the bits at
                                              //location where
       void GetChars(char* where);            //Gets the bitfield & puts it at where
       friend char operator >= (CBits&, CBits&);//operator for >=
       CBits operator = (const CBits&);       //operator for =
    private:
       char    bitchar[(n-1)/8+1];            //the bitfield
};
/******************************************************************
       CCoder is the class that codes and decodes data
*******************************************************************/
class CCoder{
    public:
       #define    rounds n+1    //defines the number of rounds used
                                //for encryption
       CCoder( );               //Constructor - initializes all data
       ~CCoder( ) { };          //Destructor does nothing
       void    SetB(char *bits);           //Sets the uncoded bits
       void    SetCB(char *cbits);         //Sets the already coded bits
       void    SetKey(char *key);          //Sets the masterkey
       void    GetB(char *bits);           //Gets the decoded bits
       void    GetCB(char *cbits);         //Gets the coded bits
       void    GetKey(char *key);          //Gets the masterkey
       void    MakeKeys( );                //Makes J[0]-->J[n-1] and
                                           // K[0][0]-->K[n-1][n-1]
       void    Code( );                    //Codes b and puts the results in cb
       void    DeCode () ;                 //Decodes cb and puts the results in b
       CBits   b,cb,K[rounds][n],masterkey; //Bitfield data members
       char    J[rounds][n]                //b=uncoded bits
                                           //cb=coded bits masterkey=key
};                                         //K[m][n]=key to use coding bit n in round m
                                           //J[m][n]=XOR bit for coding bit n in round m
CBits::CBits( )
{
    Zero( );                               //Constructor sets all bits to zero
}
```

APPENDIX A-continued

```
CBits CBits::operator = ( const CBits& it )
{
        for(int i=0;i<=(n-1)/8;i++)
            bitchar[i]=it.bitchar[i];              //Sets all bits of this= to all
                                                   //     bits from it
        return(*this);
}
void    CBits::RotateR ( CBits it )                //Sets all bits of this to it
                                                   //    rotated one to the right
{
        for(int i=0;i<n;i++)
            SetBitValue(i,it.GetBitValue((i+1)%n));
}
void    CBits::RotateL ( CBits it )                //Sets all bits of this to it
                                                   //    rotated one to the left
{
        for(int i=0;i<n;i++)
            SetBitValue(i,it.GetBitValue((i+(n-1))%n));
}
void CBits::Zero( )                                //Sets all bits to zero
{
        for(int i=0;i<=(n=1)/8;i++)
            bitchar[i]=0;
}
charCBits::GetBitValue(int k)                      //Returns bit k's value
{                                                  //Checks to see if bit k is set
        if((char)1<<(k%8) & bitchar[k/8])          //and returns "true" if it is set
            return (true)                          //and "false" if it is not set
        return(false);
}
void CBits::SetBitValue(int k,char val)            //Sets bit k to val by masking
{
        bitchar[k/8] = bitchar[k/8] & (char)~(char)(1<<(k%8));
        if(val)
            bitchar[k/8] = bitchar[k/8] | (char) (1<<(k%8));
}
void CBits::SetChar(int k, char val)               //Sets char k of the bitfield
                                                   //    to val
{
        bitchar[k]=val;
}
char CBits::GetChar(int k)                         //Returns char k of the bitfield
{
        return(bitchar[k]);
}
void CBits::SetChars(char *where)                  //Copies the bitfield from
                                                   //    *where to bitchar
{
        for(int i=0;i<=(n-1)/8;i++)
            bitchar[i]=where[i];
}
void    CBits::GetChars(char *bits)                //Copies the bitfield to *bits
{
        for(int i=0;i<=(n-1)/8;i++)
            bits[i]=bitchar[i];
}
char operator>=( Cbits &lhs, Cbits &rhs)           //operator for >=
{
        char    a,b;
        for(int i=(n-1)/8 ;i>=0;i--)               //move high->low bit
            {
            a=lhs.Getchar(i);                      //get the bit for left side
            b=rhs.GetChar(i);                      //get the bit for right side
            if(a >b)                               //if a>b then lhs must be >rhs
                return(TRUE);
            else
                {
                if(a<b)                            //if a<b then lhs must be <rhs
                    return(FALSE);
                }                                  //repeat loop if a==b
            }
        return(TRUE);                              //if loop is completed lhs==rhs
}
CCoder::CCoder( )
{                                                  //all CBits are initialized automatically
        for(int m=0;m<rounds;m++)                  //This loop sets all of J = FALSE
            {
            for(int i=0;i<n;i++)
                {
```

APPENDIX A-continued

```
                J[m][i]=FALSE;
            }
        }
}
/****************************************************************************
        MakeKeys is a key "scheduler" which takes the n bits from the masterkey
        and distributes them to the J and K keys. The specific approach to
        accomplish scheduling may be varied without departing from the present
        invention. Also, MakeKeys could be used to create the L key, if so
        desired. MakeKeys sets up the arrays of keys (J[0][0]->J[rounds-1][n-1]
        and K[0][0]->K[rounds-1][n-1]
****************************************************************************/
void CCoder::MakeKeys( )
{
        CBits   temp1,temp2;
        temp1=masterkey;
        for(int m=0;m<rounds;m++)
           {
           temp2.RotateR(temp1);        //Rotates masterkey around for randomness
           for(int i=0;i<n;i++)
                {               //K[m][i] must have all bits higher than i=FALSE
                for(int j=0;j<=i;j++)
                    K[m][i].SetBitValue(j,temp2.GetBitValue(j));
                for(j=i;j<n;j++)
                    K[m][i].SetBitValue(j,FALSE);
                }
           for(i=0;i<n;i++)                     //Sets J
                {
                J[m][i]=temp2.GetBitValue(i);
                }
           temp1=temp2;
           }
}
void    CCoder::GetB(char *bits)
{
        b.GetChars(bits);               //send the b array to bits
}
void    CCoder::GetCB(char *cbits)
{
        cb.GetChars(cbits);             //send the cb array to cbits
}
void    CCoder::GetKey(char *key)
{
        masterkey.GetChars(key);        //send the masterkey data to key
}
void    CCoder::SetB(char *bits)
{
        b.SetChars(bits);               //Set bit array to data at bits
}
void    CCoder::SetCB(char *cbits)
{
        cb.SetChar3(cbits);             //Set cbit array to data at cbits
}
void    CCoder::SetKey(char *key)
{
        masterkey.SetChars(key);        //Sets the masterkey to data at key
        MakeKeys( );                    //Makes new keys based on masterkey
}
void    CCoder::Code( )
{
    int m,t;
    char res, ib;
    Cbits vb;                           //virtual b - so b doesn't get touched
    cb=b;                               //init loop
    for(m=0;m<rounds;m++)               //loop for rounds
        {
        vb.RotateL(cb);                 //Rotate last round to the left,
                                        // i.e., L=0 always
        cb.Zero( );                     //zero the output from last round
        for(t=0;t<n;t++)                //Round loop
                {
                ib=cb>=K[m][t];                 //ib
                res=ib^(vb.GetBitValue(t))^J[m][t];   //ib xor i[round][bit]
                                                //    xor vb[bit]
                cb.SetBitValue(t,res);          //set the value of cb[bit]
                }
        }
}
void    CCoder::DeCode( )
```

APPENDIX A-continued

```
{
    int      m,t;
    char     res,ib,val;
    CBits    vb;
    vb=cb;                              //init loop
    for(m=rounds-1;m>=0;m--)            //m is the round number
    {
        for(t=n-1;t>=0;t--) //Round loop = cb[t]->b[t]
        {
            val=vb.GetBitValue(t);      //Save the value of cb[t]
            vb.SetBitValue(t,FALSE);    //mask high order bits for >= operation
            ib=vb>=K[m][t];             //find ib
            res=ib^val^J[m][t];         //b[t]=ib xor vb[t] xor J[t]
            b.SetBitValue(t,res);       //set b[t]
        }
        vb.RotateR(b);        //Rotate the output from last round by one to right
    }
    b=vb;                               //Set b
}
main ( )
{
    CCoder   Coder;
    char     key;
    char     Message[20]="ITS ALL GREEK TO ME";
    char     codedMessage[20]=" ";
    char     decodedMessage[20]=" ";
    int      len,place;
    key = 233;
    Coder.SetKey(&key);
    Coder.MakeKeys( );
    clrscr( );
    cout << "Plaintext message:\n " <<Message << "\n";
    len = stolen(Message);
    cout << "Plaintext ASCII codes:\n ";
    for (place = 0; place < len; place++)
    {
        cout << int(Message[place]) << " ";
    }
    cout << "\n\n";
    cout << "Coded message:\n ";
    for (place = 0; place < len; place++)
    {
        Coder.SetB(&Message[place]);
        Coder.Code( );
        Coder.GetCB(&codedMessage[place]);
        codedMessage[place+1] = 0;
        cout << int(codedMessage[place]) << " ";
    }
    cout << "\n\n";
    cout << "Decoded ASCII codes:\n ";
    for (place = 0; place < len; place++)
    {
        Coder.SetCB(&codedMessage[place]);
        Coder.Decode( );
        Coder.GetB(&decodedMessage[place]);
        decodedMessage[place+1] = 0;
        cout << int(decodedMessage[place]) << " ";
    }
    cout << "\nDecoded message:\n " << decodedMessage << "\n";
    return 0;
}
```

I claim:

1. A cryptographic communications system comprising:

(a) a communications channel;

(b) an encoding means coupled to said channel and adapted for transforming a transmitted plaintext signal, b, to a ciphertext signal, c, and for transmitting c on said channel, said cryptographic communications system using at least a first key, J, having n bits and a second key, K, having n*(n−1)/2 bits, the bits of the K key being divided among n−1 K(i) keys, where i is a number which goes from 1 to n−1, and each K(i) key has i bits, and where J and K are used, in connection with the plaintext signal, b, to create a scramble of the original plaintext signal in accordance with the formula:

$$cb(i)=b(i) XOR (\text{Boolean}(cb_{(0 \rightarrow i-1)} \geq K(i))) XOR J(i),$$

where cb(i) is the output cipherbit, b(i) is the input plaintext bit, J(i) is a bit from a first encryption key, K(i) is a binary number comprised of i bits from said second encryption key, and the expression Boolean($cb_{(0 \rightarrow i-1)} \geq K(i)$) is 1 if the value of the preceding cipherbits, expressed as a single number is greater than or equal to the value of K(i), and the expression Boolean($cb_{(0 \rightarrow i-1)} \geq K(i)$) is 0 if the value of the preceding cipherbits, expressed as a single number is less than the value of K(i).

2. The cryptographic communications system of claim 1 further comprising an L key having one of two possible values, said two possible values of said L key being either 0 or 1, whereby when said L key has a first value, the bits of the ciphertext are rotated to the left, and when said L key has a second value, the bits of the ciphertext are rotated to the right.

3. A cryptographic communications system comprising:

(a) a communications channel;

(b) at least one encoding means adapted for transforming an input signal, b, to a ciphertext signal, c, each encoding means of said cryptographic communications system using at least a first key, J, having n bits and a second key, K, having $n*(n-1)/2$ bits, the bits of the K key being divided among n−1 K(i) subkeys, where i is a number which goes from 1 to n−1, and each K(i) subkey has i bits, and where J and K are used, in connection with the input signal, b, to create a scramble of the original input signal in accordance with the formula:

$$cb(i)=b(i) XOR (Boolean(cb_{(0 \to i-1)} \geq K(i))) XOR J(i),$$

where cb(i) is the output cipherbit, b(i) is the input bit, J(i) is a bit from a first encryption key, K(i) is a binary number comprised of i bits from said second encryption key, and the expression $Boolean(cb_{(0 \to i-1)} \geq K(i))$ is 1 if the value of the preceding cipherbits, expressed as a single number is greater than or equal to the value of K(i), and the expression $Boolean(cb_{(0 \to i-1)} \geq K(i))$ is 0 if the value of the preceding cipherbits, expressed as a single number is less than the value of K(i);

(c) means for receiving the output, c, of an encoding means, said means for receiving having an output which goes to a device selected from the group consisting of (i) an additional encoding means, and (ii) said communications channel, whereby the output of each encoding means will become either the input of a subsequent encoding means, or the output onto said communications channel.

4. The communications system of claim 3 wherein there are m encoding means, m being a number greater than 0.

5. The communications system of claim 3 wherein each encoding means further comprises means for rotating the output of each said encoding means either left or right prior to passing said output on to said means for receiving.

6. The communications system of claim 5 wherein said means for rotating includes a fixed rotation of the bits of the output, c, whereby said bits will be rotated either to the left or to the right.

7. The communications system of claim 5 wherein said means for rotating is selectively determined by the setting of a bit in a rotation key, L, said rotation key having a single bit which designates whether the rotation should be to the left or to the right.

8. The communications system of claim 3 further comprising means for taking a master key having n bits and creating therefrom a set of keys, J(i) and K(i), wherein said keys J(i) and K(i) which are created from said master key are each comprised of bits which are from particular locations in said master key, whereby the selection of a single n-bit master key provides the bits which are mapped into the keys, J(i) and K(i).

9. A method for establishing cryptographic communications comprising the steps of:

(a) Selecting a first key, J, said first key capable of being expressed by n bits;

(b) Selecting a second key, K, having $n*(n-1)/2$ bits, said K key being comprised of n−1 K(i) subkeys, where i is a number which goes from 1 to n−1, and each K(i) subkey has i bits;

(c) Taking a plaintext message, b, and obtaining a ciphertext, cb, by repeatedly performing the following steps thereon:

(i) Breaking said plaintext message, b, into blocks, each block having no more than n bits;

(ii) Performing the bitwise operation:

$$cb(i)=b(i) XOR (Boolean(cb_{(0 \to i-1)} \geq K(i))) XOR J(i),$$

whereby, the ciphertext message cb(i) will be created in a bitwise manner.

10. The encryption method of claim 9 comprising the further step of selectively rotating the n bits of the ciphertext either to the right or to the left as determined by a rotation key, L, said rotation key, L, having one of two possible values, said two possible values of said L key being either 0 or 1, whereby when said L key has a first value, the bits of the ciphertext are rotated to the left, and when said L key has a second value, the bits of the ciphertext are rotated to the right.

11. The encryption method of claim 9 comprising the further step of processing the output ciphertext, cb, by at least one additional encryption step comprising performing the following steps thereon:

(i) Breaking said output ciphertext, cb, into blocks, each block having no more than n bits, each block being treated as "relative" plaintext, b;

(ii) Performing the bitwise operation:

$$cb(i)=b(i) XOR (Boolean(cb_{(0 \to i-1)} \geq K(i))) XOR J(i),$$

whereby, the ciphertext message cb(i) will be created in a bitwise manner.

12. The encryption method of claim 11 comprising the further step of selectively rotating the n bits of the output ciphertext either to the right or to the left as determined by a rotation key, L, said rotation key, L, having one of two possible values, said two possible values of said L key being either 0 or 1, whereby when said L key has a first value, the bits of the ciphertext are rotated to the left, and when said L key has a second value, the bits of the ciphertext are rotated to the right.

13. The encryption method of claim 10 further comprising the step of using a master key having n bits to create the keys J(i) and K(i), whereby the n bits of the master key are selectively distributed among the bits of the J(i) and K(i) keys.

* * * * *